(12) United States Patent
Koktan et al.

(10) Patent No.: US 8,976,803 B2
(45) Date of Patent: *Mar. 10, 2015

(54) MONITORING RESOURCE CONGESTION IN A NETWORK PROCESSOR

(71) Applicant: Alcatel-Lucent, Paris (FR)

(72) Inventors: Toby J. Koktan, Nepean (CA); William R. McEachern, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/860,848

(22) Filed: Apr. 11, 2013

(65) Prior Publication Data

US 2013/0227135 A1 Aug. 29, 2013

Related U.S. Application Data

(63) Continuation of application No. 13/029,583, filed on Feb. 17, 2011, now Pat. No. 8,483,234.

(51) Int. Cl.
*H04L 12/26* (2006.01)

(52) U.S. Cl.
CPC ............ *H04L 43/0876* (2013.01); *H04L 43/16* (2013.01)
USPC .......................................... 370/413; 370/419

(58) Field of Classification Search
None
See application file for complete search history.

(56) References Cited

U.S. PATENT DOCUMENTS

| 2002/0133729 | A1* | 9/2002 | Therien et al. | 713/330 |
| 2005/0192766 | A1* | 9/2005 | Hanebutte | 702/57 |
| 2006/0123253 | A1* | 6/2006 | Morgan et al. | 713/300 |
| 2008/0201591 | A1* | 8/2008 | Hu et al. | 713/323 |
| 2008/0229127 | A1* | 9/2008 | Felter et al. | 713/320 |
| 2008/0295098 | A1* | 11/2008 | Cardona et al. | 718/101 |
| 2010/0274890 | A1* | 10/2010 | Patel et al. | 709/224 |
| 2010/0281482 | A1* | 11/2010 | Pike et al. | 718/102 |
| 2010/0332856 | A1* | 12/2010 | Song | 713/300 |

* cited by examiner

*Primary Examiner* — Chi H Pham
*Assistant Examiner* — Soon-Dong D Hyun
(74) *Attorney, Agent, or Firm* — Kramer & Amado, P.C.

(57) ABSTRACT

Embodiments of the invention are directed to monitoring resources of a network processor to detect a condition of exhaustion in one or more of the resources over a predetermined time interval and to provide an indication of the condition. Some embodiments periodically sample various resources of a network processor and from the samples calculate utilization of the network processor's memory bus and core processor, and determine if an interworking FIFO packet queue error has occurred. Such information may help network operators and/or support engineers to quickly zero in on the root cause and take corrective actions for network failures which previously could have been attributed to many different causes and that would have required significant time and effort to troubleshoot.

20 Claims, 5 Drawing Sheets

MONITORING RESOURCE CONGESTION IN A NETWORK PROCESSOR

FIELD OF THE INVENTION

The invention is directed to monitoring resources of a network processor, particularly to detect a congestion condition in the resources.

BACKGROUND OF THE INVENTION

Network processors (NPs) are employed in many of today's communications products, as opposed to traditional application specific integrated circuits (ASICs) or field programmable gate array (FPGA) fixed hardware, primarily because the architecture of these processors provides the flexibility of a software based feature set solution with the high performance of ASICs. Network processors utilize parallel processing or serial pipelines and are programmable like general purpose microprocessors, but are optimized for packet processing operations required by data packet network communication devices.

A typical architecture of a network processor includes multiple core processors (CP), also referred to as packet processing engines, a plurality of interworking first-in-first-out (FIFO) queues implemented in memory, and one or more memory buses (MB) interconnecting the core processors with the FIFO queues and external memories. Packets are stored in the interworking FIFO queues between processing operations performed on the packets by various core processors. The core processors, memory buses, and interworking FIFO queues are hereinafter referred to collectively as network processor resources.

Transient traffic bursts or a constant high rate of small packets that cannot be handled by a network processor due to physical limitations of the network processor resources may lead to silent traffic loss. The traffic lost in this case would typically be random and indiscriminate, that is, packets of any traffic priority could be affected. Such loss may result in loss of data services, which could be difficult to detect and debug in a live deployment.

Therefore, a way of monitoring resources of a network processor to detect a congestion condition in the resources is desired.

SUMMARY

Embodiments of the invention are directed to monitoring resources of a network processor to detect a condition of exhaustion in one or more of the resources over a predetermined time interval and to provide an indication of the condition.

Some embodiments of the invention periodically sample various resources of a network processor and from the samples calculate utilization of the network processor's memory bus or buses and core processor, and determine if an interworking FIFO packet queue error has occurred.

Some embodiments of the invention provide a method executed on a microprocessor to automatically detect a condition of exhaustion in one or more resources of a network processor. Other embodiments provide the method written in microcode and executed on the network processor, while other embodiments execute some steps of the method on the microprocessor and the remainder of the steps on the network processor.

Advantageously, some embodiments of the invention can be deployed in communications systems already in service by a software upgrade in the field, thereby avoiding the expense of hardware replacements.

According to an aspect of the invention a method of monitoring resources of a network processor is provided. The method comprises: retrieving a first set of utilization data of the resources; determining from the first set of utilization data if an exhaustion condition of any of the resources exists during a sampling interval; determining, responsive to said exhaustion condition existing, if the exhaustion condition persists for a predetermined first interval of time; and setting an indication of the exhaustion condition responsive to the exhaustion condition persisting for the first interval.

According to another aspect of the invention a device for monitoring resources of a network processor is provided. The device comprises: a processor for executing program instructions; a memory; and an interface for retrieving utilization data concerning resources of a network processor. The memory includes program instructions for execution by the processor thereby making the processor operable to: retrieve a first set of utilization data of the resources; determine from the first set of utilization data if an exhaustion condition of any of the resources exists during a sampling interval; determine, responsive to said exhaustion condition existing, if the exhaustion condition persists for a predetermined first interval of time; and set an indication of the exhaustion condition responsive to the exhaustion condition persisting for the first interval.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
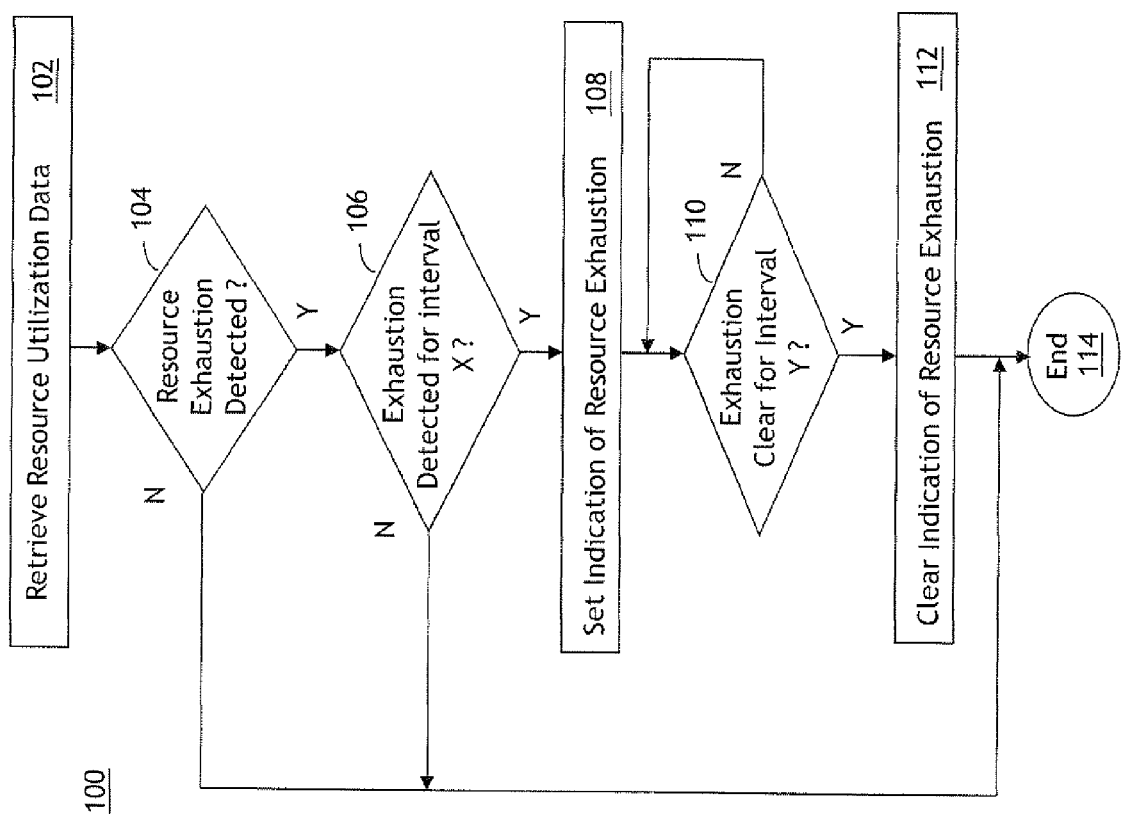
FIG. 1 is a flow chart illustrating a method of monitoring resources of a network processor according to a first embodiment of the invention.

Embodiments address the need to mitigate the potential for silent traffic loss in a network processor. This mitigation is achieved by monitoring resources of the network processor and providing an indication when such resources reach a predetermined level of utilization, or exhaustion, thereby rendering any traffic loss resulting from such exhaustion as no longer being silent. That is, a traffic loss event can be correlated with the indication of exhaustion, such as provided by an alarm or log entry, and thereby the cause of the loss can be determined. Such monitoring is provided by a method implemented as a software state machine executed on a general purpose microprocessor with access to the network processor to monitor the health of the network processor's resources. The term health is used to collectively refer to exhaustion, or over-utilization, of network resources such as processing capacity of the core processors and bandwidth of the memory buses, as well as errors and storage capacity exhaustion in the interworking FIFO packet queues.

Indications in the form of log alarm messages for a network processor entering and exiting states of persistent resource exhaustion are produced by the software state machine and can be correlated to network events e.g. control protocols going down, service interruptions, etc. The software state machine also provides a history of the worst case operating conditions encountered by the network processor, which may serve as a useful debug tool for traffic management engineering in a data communications network.

The monitoring method periodically samples various resources on the network processor. From these samples utilization of the memory bus, or memory buses if the network processor has more than one, is calculated. Likewise, from the samples utilization of the core processor, or core processors if the network processor has more than one, is calculated. Additionally, when an interworking FIFO packet queue error such as an overflow has occurred, the samples include an indication of such an error occurrence.

According to the method, if any of the calculated utilizations are above a predetermined respective threshold or if an error has occurred with respect to any of the interworking FIFO packet queues, the method checks for persistence of the detected condition of so-called resource exhaustion. If any one or more of the conditions above are encountered, the method checks for persistence of the resource exhaustion condition. That is, the method checks for the continued existence of the resource exhaustion condition during a predetermined time interval e.g. 300 ms. The method either does nothing if the condition clears (i.e. a false positive was detected) or proceeds as follows:

1) A log message in the form of a warning with date/time stamp is raised when the method has detected a persistent (e.g. lasting 300 ms) resource exhaustion condition. For example: "Network Processor Resource Congestion Detected—Memory Bus Bandwidth Exhausted"
2) The method then proceeds to continuously monitor NP resources as before.
3) A log message is raised when there has been no resource exhaustion detected in repeated checks for a prolonged period (e.g. 60 seconds) after 1) has occurred. This eliminates noisy alarm generation and provides an indication to the network operator that normal processing capabilities have been restored.

The software state machine monitor also keeps a record of the following: i) worst case operating conditions encountered by the network processor since the network processor started up, and ii) a history of periods of resource exhaustion (timestamp for enter/exit of resource monitoring states) encountered by the network processor. This record can be retrieved by a network operator or support personal to aid in troubleshooting network failures.

FIG. 1 depicts a method 100 of monitoring resources of a network processor according to a first embodiment. The method 100 is executed on a general purpose microprocessor with access to the network processor. The method 100 starts with retrieving 102, from the network processor, resource utilization data pertaining to resources of the network processor. From the resource utilization data, the method 100 then determines 104 if any of the resources to which the utilization data pertains has reached a condition of exhaustion. The steps involved in this determination 104 will be described in detail later with reference to FIG. 2. If no exhaustion condition on any of the resources is detected the method 100 ends 114, otherwise the method 100 proceeds to determining 106 if the detected exhaustion condition persists for a predetermined first interval (X) of time. The steps involved in this determination 106 will be described in detail later with reference to FIG. 3. If the exhaustion condition does not persist throughout the first interval (X) the method 100 ends 114, otherwise the method 100 sets 108 an indication of the resource exhaustion. The indication could be an alarm or warning visible to an operator of a system incorporating the network processor, or alternatively an additional indication could be an entry in a log file for future access, e.g. by the operator. The method 100 then determines 110 if the network processor resources are clear of all exhaustion conditions for a predetermined second interval (Y) of time. The steps involved in this determination 110 will be described in detail later with reference to FIG. 4. As long as any exhaustion condition on the network processor resources exists and until all exhaustion conditions of the resources have ceased for the duration of the second interval, the method 100 repeats this step of determining 110; otherwise the method 100 clears 112 the indication of exhaustion and the method ends 114. Typically the method 100 would be restarting after ending 114 so that it continually monitors resources of the network processor.

Figure 2:
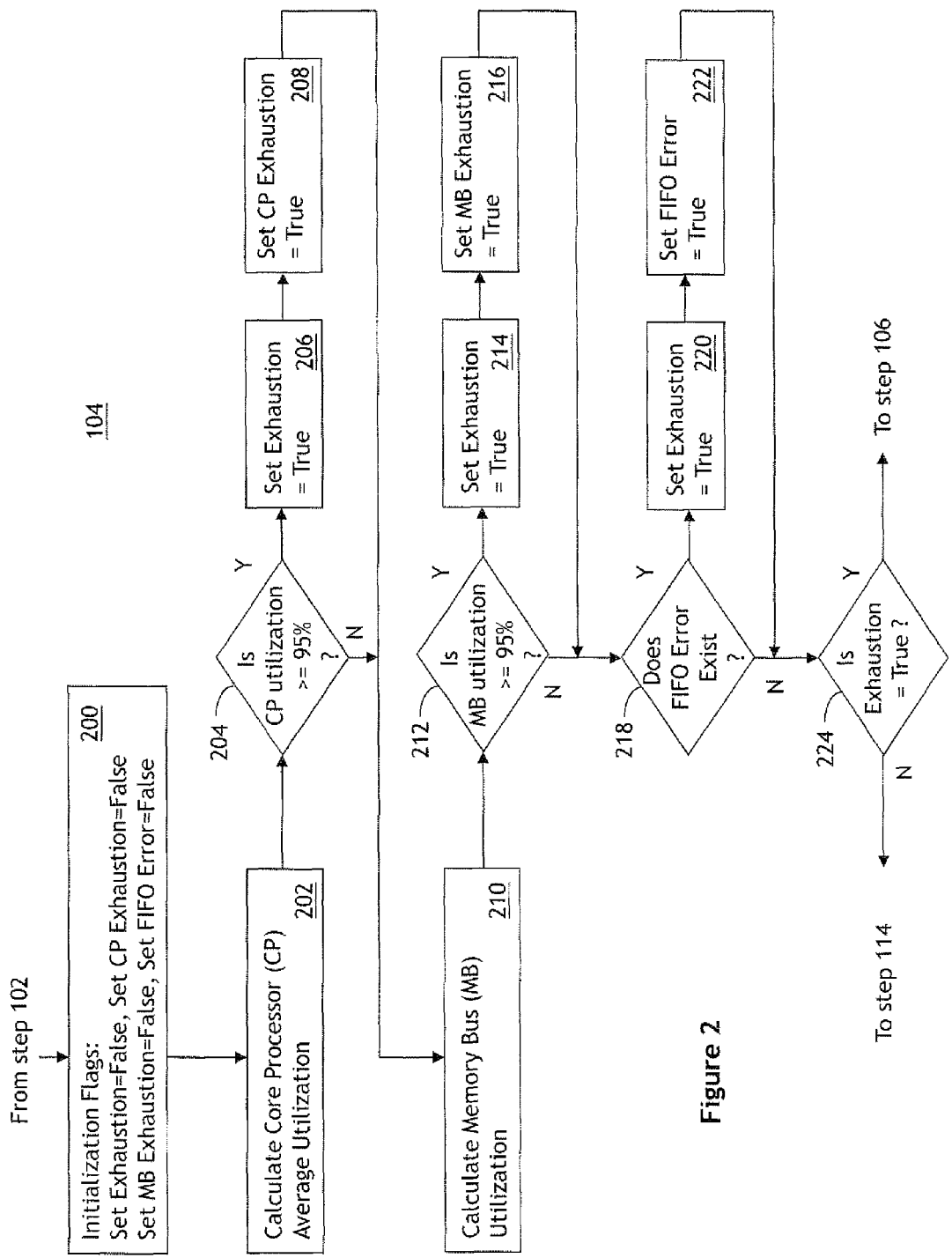
FIG. 2 depicts a step in the method of FIG. 1 in greater detail.

FIG. 2 depicts in greater detail the step of determining 104 if any of the resources to which the utilization data pertains has reached a condition of exhaustion. The step of determining 104 begins by initializing all flags used by the step to false. Next core processor utilization is calculated 202 from the utilization data. If the network processor has multiple core processors, then an overall average core processor utilization is calculated 202 from utilization data of the core processors. Next the core processor utilization, or overall average core processor utilization in the case of multiple core processors, is compared 204 to a threshold, which in this case is 95%. If the core processor utilization, or overall average utilization as the case my be, is greater than or equal to the threshold, optionally simply greater than the threshold, an exhaustion flag is set 206 to true and a core processor (CP) exhaustion flag is set 208. The step 104 then proceeds to calculating 210 memory bus utilization of the network processor.

The exhaustion flag will be used later to determine if the method 100 should end 114 or continue to the next step of determining 106 if the exhaustion condition persists for the first interval. Optionally the indication of resource exhaustion could include information pertaining to which core processor utilization is in a condition of exhaustion where there are multiple core processors and multiple CP exhaustion flags have been used.

If the comparison 204 results in the core processor utilization, or overall average CP utilization in the case of multiple core processors, being less than the threshold, optionally less than or equal to where greater than was used as a comparison criteria, the step 104 proceeds to calculating 210 a utilization of the memory bus of the network processor. If the network processor has multiple memory buses, then a respective utilization is calculated 210 for each memory bus for which data is included in the retrieved utilization data. Next the utilization is compared 212 to a threshold, which in this case is 95%. Where there are multiple memory buses this comparison 212 is done for each memory bus for which a utilization has been calculated 210, and in some embodiments each such comparison 212 may be made to a respective threshold; however in this embodiment a single threshold is used. If the utilization is greater than or equal to the threshold, optionally simply greater than the threshold, the exhaustion flag is set 214 to true and a memory bus (MB) exhaustion flag is set 216. With multiple memory buses, the exhaustion flag will be set 214 to true if the utilization of any of the memory buses is greater than or equal to its respective threshold, likewise a respective MB exhaustion flag will be set 216 to true. The step 104 then proceeds to determining 218 if an error pertaining to the interworking FIFO queue of the network processor exists. Optionally the indication of resource exhaustion could include information pertaining to which memory bus utilization is in a condition of exhaustion where there are multiple memory buses and multiple MB exhaustion flags have been used.

If the comparison 212 results in the utilization of the memory bus being less than the threshold, the step 104 proceeds to determining 218 if an error exists on any of the interworking FIFO queues. The determination 218 involves interpreting the utilization data retrieved from the network processor. In some cases such data may include a status of the FIFO queues which specifically indicates an error condition such as a queue overflow condition existing on one or more of the queues. Additionally or alternatively the utilization data may be compared to certain criteria to make the determination, e.g. FIFO queue fill levels could be compared to one or more thresholds. If an error exists with respect to any of the FIFO queues the exhaustion flag is set 220 to true and a FIFO error flag is set 222 to true. The step 104 then proceeds to determining 224 if the exhaustion flag is true. Optionally the indication of resource exhaustion could include information pertaining to which FIFO queue is in a condition of exhaustion where there are multiple FIFO queues and multiple FIFO error flags have been used.

Determining 224 if exhaustion is true simply involves testing the exhaustion flag to check if it is true. If the exhaustion flag is true the method 100 proceeds to the step of determining 106 if the exhaustion condition persists for the first interval; otherwise the method 100 ends 114. Alternatively to testing the exhaustion flag this determination 224 could be made by testing a logical OR of the CP exhaustion, MB exhaustion and FIFO error flags and if the result is true the method 100 proceeds to the step of determining 106 if the exhaustion condition persists for the first interval. If this option is implemented the steps of setting 206, 214, and 220 the exhaustion flag can be omitted.

Figure 3:
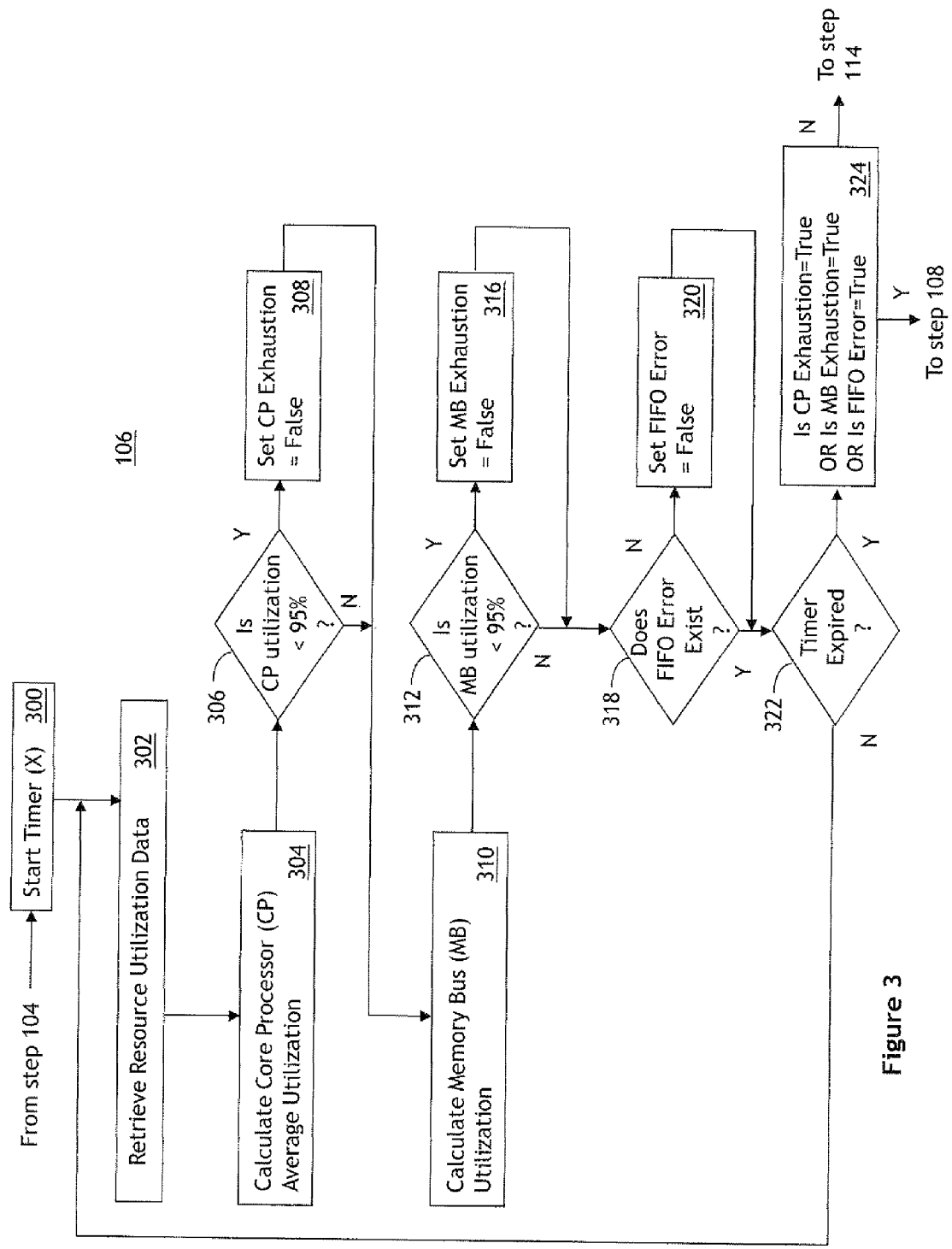
FIG. 3 depicts another step in the method of FIG. 1 in greater detail.

FIG. 3 depicts in greater detail the step of determining 106 if the exhaustion condition persists for the first interval. The step 106 begins with starting 300 a timer programmed for the duration of the first interval (X). In this embodiment the timer is a countdown timer. Later in the step 106 the timer is checked to determine 322 if it has expired. However, as an alternative a count-up timer could be used in which case the timer would start at zero and the step of checking would be to detect if the timer has reached the value of the first interval (X) of time. Next the step 106 proceeds to retrieving 302 a second set of utilization data pertaining to the resources of the network processor. Calculation 304 of CP utilization follows in the same manner as described previously with the calculation 202 except the second set of utilization data is used. Similarly to the calculation 202 done previously, this present calculation 304 involves calculating an overall average CP utilization when there are multiple core processors. Next the CP utilization, or the overall average CP utilization as the case may be, is compared 306 to a threshold and responsive to the utilization being less than the threshold, which in this case is 95%, the CP exhaustion flag is set 308 to false and the step 106 proceeds to calculating 310 utilization of the memory bus or each memory bus if there are more than one. If the comparison 306 results in the CP utilization, or overall average CP utilization if there a multiple core processors, being greater than or equal to the threshold, e.g. 95%, the step 106 proceeds to calculating 310 the utilization of the memory bus.

Calculating 310 the utilization of the memory bus follows in the same manner as described previously with the calculation 210 except the second set of utilization data is used. Similarly to the calculation 210 done previously, this present calculation 310 may be done for multiple memory buses. Next the memory bus utilization is compared 312 to a threshold and responsive to the utilization being less than the threshold, which in this case is 95%, the MB exhaustion flag is set 316 to false and the step 106 proceeds to determining 318 if any FIFO queue errors exist. As with the previous comparison 212, the present comparison 312 may be done with respect to multiple memory buses and their respective calculated utilizations and thresholds. If the comparison 312 results in the utilization of the memory bus being greater than or equal to the threshold, e.g. 95%, the step 106 proceeds to determining 318 if any FIFO queue errors exist.

Determining 318 if an error exists on any of the interworking FIFO queues, as with the similar determination 218 previously described, involves interpreting the utilization data retrieved from the network processor. In some cases such data may include a status of the FIFO queues which specifically indicates an error condition such as a queue overflow condition exists on one or more of the queues. Additionally or alternatively the utilization data may be compared to certain criteria to make the determination, e.g. FIFO queue fill levels could be compared to one or more thresholds. If no error exists with respect to any of the FIFO queues the exhaustion flag is set 320 to false and the step 106 then proceeds to determining 322 if the timer has expired. Otherwise, if an error with respect to any of the FIFO queues does exist the step 106 proceeds directly to determining 322 if the timer has expired.

If the timer has not expired, that is the first interval has not elapsed, the step 106 returns to retrieving 302 another set of utilization data of the resources and execution of the step 106 continues as previously described. However, if the timer has expired then the step 106 proceeds to determining 324 if any of the CP exhaustion flag, MB exhaustion flag, or FIFO error flag is true, and in the affirmative case, the method 100 proceeds to setting 108 an indication of resource exhaustion. Otherwise, if none of the CP exhaustion flag, MB exhaustion flag, or FIFO error flag is true the method 100 ends 114.

The determination 106 checks if the exhaustion condition persists for the entire first interval (X). Accordingly, instead of making all three comparisons 306, 312, and 318 to check the CP and MB utilization and for a FIFO error in step 106, the respective flags (CP exhaustion, MB exhaustion, and FIFO error) could be used to select which of the comparisons 306, 312, and 318 needs to be performed to ascertain if the respective exhaustion, or error, condition has cleared. For example, if CP exhaustion is true then only the comparison 306 for CP utilization (and its accompanying step 308) needs to be performed.

Figure 4:
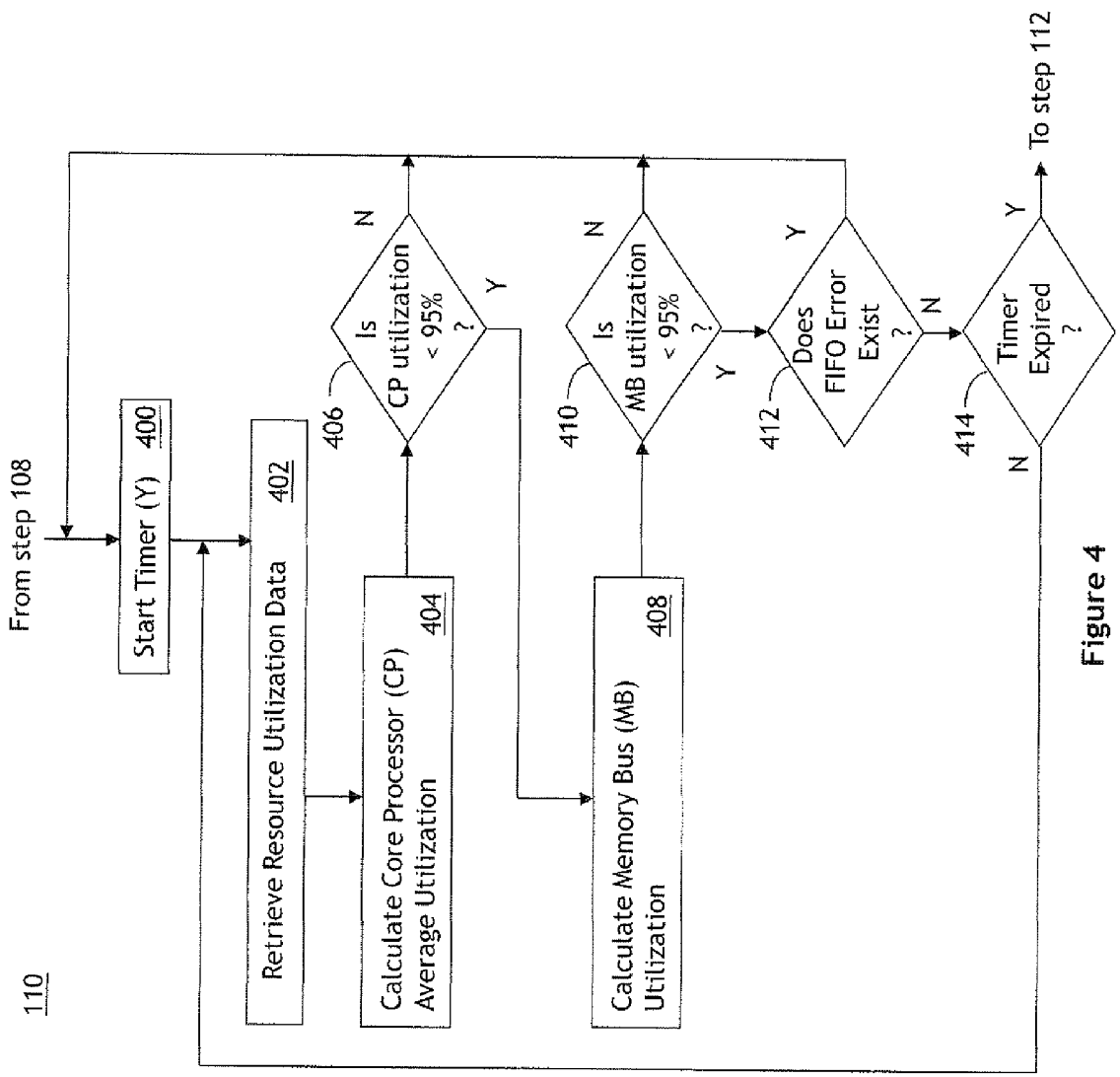
FIG. 4 depicts yet another step in the method of FIG. 1 in greater detail.

FIG. 4 depicts in greater detail the step of determining 110 if the exhaustion condition is clear for the second interval. The step 110 begins with starting 400 a timer programmed for the duration of the second interval (Y). In this embodiment the timer is a countdown timer. Later in the step 110 the timer is checked to determine 414 if it has expired. However, as an alternative a count-up timer could be used in which case the timer would start at zero and the step of checking would be to detect if the timer has reached the value of the second interval (Y) of time. Next the step 110 proceeds to retrieving 402 a third set of utilization data pertaining to the resources of the network processor. Calculation 404 of core processor utilization follows in the same manner as described previously with the calculation 302 except the third set of utilization data is used. Similarly to the calculation 302 done previously, this present calculation 404 involves calculating an overall average CP utilization when there are multiple core processors. Next the core processor utilization is compared 406 to a threshold and responsive to the utilization being less than the threshold, which in this case is 95%, the step 110 proceeds to calculating 408 utilization of the memory bus. As with the previous comparison 306, the present comparison 406 may be done with respect to an overall average CP utilization for multiple core processors. If the comparison 406 results in the CP utilization being greater than or equal to the threshold, e.g. 95%, the step 110 returns to starting 400 the timer and continuing execution as previously described.

Calculating 408 the utilization of the memory bus follows in the same manner as described previously with the calculation 310 except the third set of utilization data is used. Similarly to the calculation 310 done previously, this present calculation 408 may be done for multiple memory buses. Next the memory bus utilization is compared 410 to a threshold and responsive to the utilization being less than the threshold, which in this case is 95%, the step 110 proceeds to determining 412 if any FIFO queue errors exist. As with the previous comparison 312, the present comparison 410 may be done with respect to multiple memory buses and their respective calculated utilizations and thresholds. If the comparison 410 results in the utilization of the memory bus being greater than or equal to the threshold, e.g. 95%, the step 110 returns to starting 400 the timer and continuing execution as previously described.

Determining 412 if an error exists on any of the interworking FIFO queues, as with the similar determination 318 previously described, involves interpreting the utilization data retrieved from the network processor. In some cases such data may include a status of the FIFO queues which specifically indicates an error condition such as a queue overflow condition exists on one or more of the queues. Additionally or alternatively the utilization data may be compared to certain criteria to make the determination, e.g. FIFO queue fill levels could be compared to one or more thresholds. If no error exists with respect to any of the FIFO queues the step 110 then proceeds to determining 414 if the timer has expired. Otherwise, if an error with respect to any of the FIFO queues does exist the step 110 returns to starting 400 the timer and continuing execution as previously described.

If the timer has not expired, that is the second interval has not elapsed, the step 110 returns to retrieving 402 another set of utilization data of the resources and execution of the step 110 continues as previously described. However, if the timer has expired then the step 110 proceeds by clearing 112 the indication of exhaustion.

The purpose of returning to starting 400 the timer in the case of CP utilization, or MB utilization being greater than or equal to the threshold, or a FIFO error existing, is to restart timing of the second interval during which time no exhaustion condition may exist in order for the method 100 to proceed to clearing 112 the indication of exhaustion.

Figure 5:
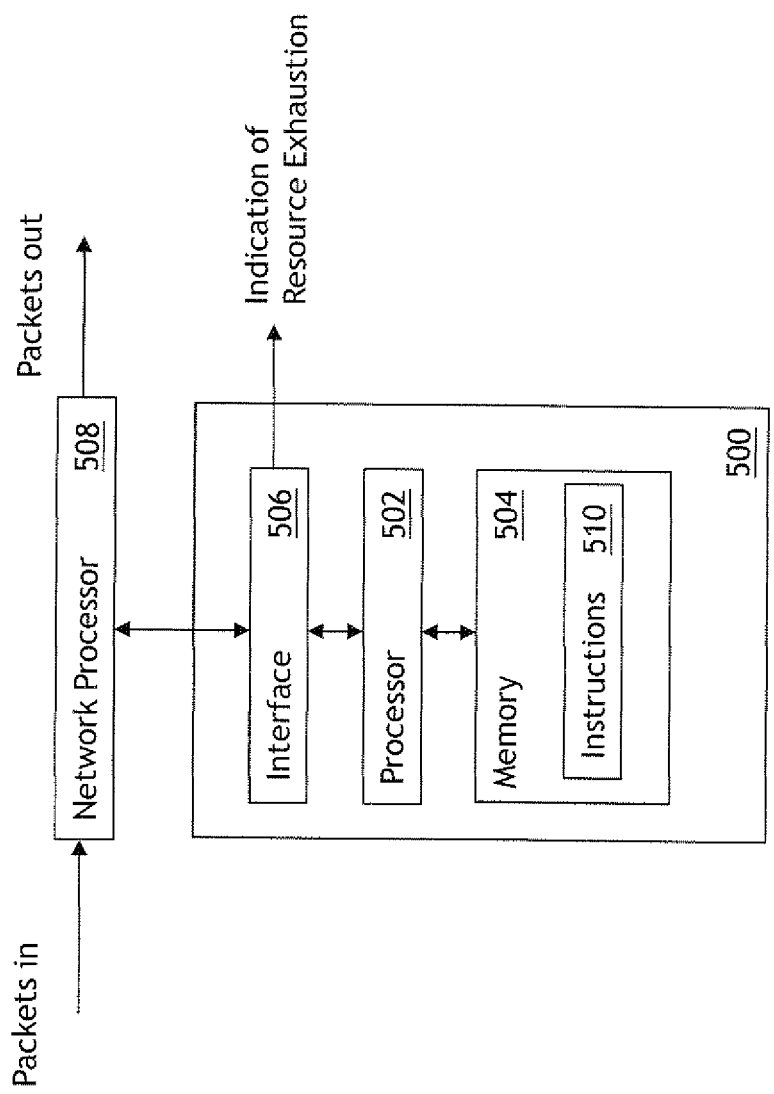
FIG. 5 depicts a device for monitoring resources of a network processor according to a second embodiment of the invention.

FIG. 5 depicts a device 500 for monitoring resources of a network processor 508 according to a second embodiment of the invention. The device 500 includes a processor 502 in communication with a memory 504 and an interface 506. The interface 506 enables the device 508 to retrieve utilization data concerning resources of the network processor 508. The processor 502 is operable to execute program instructions 510 stored in the memory 504. The program instructions 510 embody the method 100 of monitoring resources previously described. The device 500 configured as such by virtue of the program instructions 510 is operable to detect a condition of exhaustion of one or more resources of the network processor 508 and raise an indication of resource exhaustion when such an exhaustion condition is detected. The indication may prove useful to identify a cause of traffic loss or other network failure related to data packet traffic being processed by the network processor 508, which loss or failure may otherwise have been deemed as a silent traffic loss or failure.

Advantageously, embodiments of the method allow network operators and/or support engineers to quickly zero in on root cause and take corrective actions for network failures which previously could have been attributed to many different causes that would have required significant time and effort to troubleshoot.

Advantageously, embodiments of the method implemented as a software solution can be applied to existing products that are already deployed in customer networks because no new hardware is needed in such implementations.

Further advantageously, embodiments of the invention have broad applicability in telecom and other high-reliability applications that are likely to use network processors.

Numerous modifications, variations and adaptations may be made to the embodiments of the invention described above without departing from the scope of the invention, which is defined in the claims.

What is claimed is:

1. A method of monitoring resources of a network processor, the method comprising:
retrieving a first set of utilization data regarding network processor resources;
determining, from the first set of utilization data, that an exhaustion condition exists for the network processor resources during a sampling interval;
determining whether the exhaustion condition persists for a first interval of time; and
recording a log entry based on the exhaustion condition persisting for the first interval.

2. The method of claim 1, further comprising:
entering an exhaustion state based on determining that the exhaustion condition exists;
wherein determining whether the exhaustion condition persists and recording a log entry are performed while occupying the exhaustion state.

3. The method of claim 2, wherein the exhaustion state is one of a group of possible exhaustion states and the group of possible exhaustion states comprises:
a core processor exhaustion state,
a memory bus exhaustion state, and
a first-in first-out (FIFO) error state.

4. The method of claim 1, further comprising:
providing a debug tool including a history of operating conditions, wherein the history includes a reference to the exhaustion condition persisting for the first interval.

5. The method of claim 4, wherein the history of operating conditions is a history of worst case operating conditions.

6. The method of claim 1, further comprising:
determining that no exhaustion condition has been detected during a second interval of time; and
recording a log entry based on no exhaustion condition being detected during the second interval.

7. The method of claim 6, wherein the second interval of time is at least two orders of magnitude longer than the first interval of time.

8. A device for monitoring resources of a network processor, the device comprising:
a memory; and a processor in communication with the memory, the processor being configured to:
retrieve a first set of utilization data regarding network processor resources;
determine, from the first set of utilization data, that an exhaustion condition exists for the network processor resources during a sampling interval;
determine whether the exhaustion condition persists for a first interval of time; and
record a log entry based on the exhaustion condition persisting for the first interval.

9. The device of claim 8, wherein the processor is further configured to:
enter an exhaustion state based on determining that the exhaustion condition exists;
wherein the processor is configured to determine whether the exhaustion condition persists and record a log entry while occupying the exhaustion state.

10. The device of claim 9, wherein the exhaustion state is one of a group of possible exhaustion states and the group of possible exhaustion states comprises:
a core processor exhaustion state,
a memory bus exhaustion state, and
a first-in first-out (FIFO) error state.

11. The device of claim 8, wherein the processor is further configured to:
provide a debug tool including a history of operating conditions, wherein the history includes a reference to the exhaustion condition persisting for the first interval.

12. The device of claim 11, wherein the history of operating conditions is a history of worst case operating conditions.

13. The device of claim 8, wherein the processor is further configured to:
determine that no exhaustion condition has been detected during a second interval of time; and
record a log entry based on no exhaustion condition being detected during the second interval.

14. The device of claim 13, wherein the second interval of time is at least two orders of magnitude longer than the first interval of time.

15. A non-transitory machine-readable medium encoded with instructions for monitoring resources of a network processor, the medium comprising:
instructions for retrieving a first set of utilization data regarding network processor resources;
instructions for determining, from the first set of utilization data, that an exhaustion condition exists for the network processor resources during a sampling interval;
instructions for determining whether the exhaustion condition persists for a first interval of time; and
instructions for recording a log entry based on the exhaustion condition persisting for the first interval.

16. The non-transitory machine-readable medium of claim 15, further comprising:
instructions for entering an exhaustion state based on determining that the exhaustion condition exists;
wherein the instructions for determining whether the exhaustion condition persists and recording a log entry are configured to be executed while occupying the exhaustion state.

17. The non-transitory machine-readable medium of claim 16, wherein the exhaustion state is one of a group of possible exhaustion states and the group of possible exhaustion states comprises:
a core processor exhaustion state,
a memory bus exhaustion state, and
a first-in first-out (FIFO) error state.

18. The non-transitory machine-readable medium of claim 15, further comprising:
instructions for providing a debug tool including a history of operating conditions, wherein the history includes a reference to the exhaustion condition persisting for the first interval.

19. The non-transitory machine-readable medium of claim 18, wherein the history of operating conditions is a history of worst case operating conditions.

20. The non-transitory machine-readable medium of claim 15, further comprising:
instructions for determining that no exhaustion condition has been detected during a second interval of time; and
instructions for recording a log entry based on no exhaustion condition being detected during the second interval.

* * * * *